United States Patent
Wray et al.

(10) Patent No.: US 7,344,742 B2
(45) Date of Patent: Mar. 18, 2008

(54) LOLLIPOP MANUFACTURE

(75) Inventors: Martyn Thomas Wray, Stamford (GB); Russell Kevin Hall, Deeping St. James (GB)

(73) Assignee: Baker Perkins Limited, Southampton (GB)

( * ) Notice: Subject to any disclaimer, the term of this patent is extended or adjusted under 35 U.S.C. 154(b) by 631 days.

(21) Appl. No.: 10/473,955

(22) PCT Filed: Apr. 4, 2002

(86) PCT No.: PCT/GB02/01386

§ 371 (c)(1),
(2), (4) Date: Mar. 15, 2004

(87) PCT Pub. No.: WO02/080694

PCT Pub. Date: Oct. 17, 2002

(65) Prior Publication Data

US 2004/0237799 A1 Dec. 2, 2004

(30) Foreign Application Priority Data

Apr. 6, 2001 (GB) ................................. 0108682.6

(51) Int. Cl.
*A23L 1/00* (2006.01)
(52) U.S. Cl. ............................ 426/91; 99/494; 221/81; 227/117; 426/134; 426/660

(58) Field of Classification Search ................ 227/117; 425/126.2; 198/443, 444, 384, 392; 221/168, 221/203, 202, 81; 99/494; 426/91, 134, 426/660

See application file for complete search history.

(56) References Cited

U.S. PATENT DOCUMENTS

| 3,038,635 A | * | 6/1962 | Rasmusson | 221/81 |
| 4,008,812 A | * | 2/1977 | Stuart | 198/444 |
| 4,130,936 A | * | 12/1978 | Cottrell | 29/809 |
| 4,714,419 A | * | 12/1987 | Nielsen | 425/126.2 |
| 4,729,501 A | * | 3/1988 | Lowrance | 227/117 |

* cited by examiner

*Primary Examiner*—Timothy F. Simone
(74) *Attorney, Agent, or Firm*—John P. White; Cooper & Dunham LLP

(57) ABSTRACT

Apparatus (1) and process for the manufacture of lollipops in which lollipops (3) are transferred from a substantially horizontal condition in a hopper (4), to a substantially vertical condition in a stick retainer (7) prior to placement in sugar confectionery. The apparatus comprises a hopper (4) for holding the sticks (3) with their longitudinal axes substantially horizontal, means (5) for ejecting a stick from the hopper in a substantially horizontal direction and feeder means (6) for feeding the ejected stick downwardly into a stick retainer (7) prior to placement in the sugar confectionery, the feeder means comprising a flexible tube (8) operable to conduct the stick from the hopper to the stick retainer whilst simultaneously changing the orientation at the stick to that of a downward direction.

8 Claims, 1 Drawing Sheet

LOLLIPOP MANUFACTURE

This application is a §371 national stage of PCT International Application No. PCT/GB02/01386, filed Apr. 4, 2002, designating the United States of America, which claims priority of British Application No. 0108682.6, filed Apr. 6, 2001, the entire contents of which is hereby incorporated by reference into this application.

BACKGROUND

This invention relates to the manufacture of lollipops, that is to say to candies or sweetmeats made of sugar or other flavouring or fillings, (hereinafter referred to as 'sugar confectioner'), mounted on sticks.

The present invention more particularly relates to apparatus for the transfer of lollipop sticks during the manufacture of lollipops, and provides a reliable arrangement for transfer and which is less prone to misfeeding.

The term 'stick' is used herein to denote any elongate handle for a lollipop.

BRIEF SUMMARY

According to one aspect of the invention, apparatus for the transfer of lollipop sticks during the manufacture of lollipops comprises a hopper for holding the sticks with their longitudinal axes substantially horizontal, means for ejecting a stick from the hopper in a substantially horizontal direction and feeder means for feeding the ejected stick downwardly into a stick retainer prior to placement in the sugar confectionery, the feeder means comprising a conduit operable to conduct the stick from the hopper to the stick retainer whilst simultaneously changing the orientation of the stick to that of a downward direction.

The conduit preferably comprises a tube of flexible plastics material.

The delivery end of the conduit is preferably mounted on a reciprocatable carrier that is arranged to be driven forwards in use in synchronism with stick retainers that are adapted to receive the sticks from the conduit. The stick may be of wood, lengths of polymer extrusion or rolled paper for example.

Where a stick is of substantially circular cross-section, the tube has a bore of approximately 1.5 times that of the stick.

When the stick is of non-round cross-section the conduit may be of similar cross-sectional shape. For example, when flat sticks are to be fed a conduit having a flat bore is employed.

The stick ejector means preferably comprises a push rod and an actuator which acts upon the push rod through a spring-biassed overload device.

According to another aspect of the invention there is provided a process of manufacturing of lollipops comprising transferring lollipop sticks from a substantially horizontal condition in a hopper, to a substantially vertical condition in a stick retainer prior to placement in sugar confectionery.

DETAILED DESCRIPTION OF EXEMPLARY EMBODIMENTS

Figure 1:
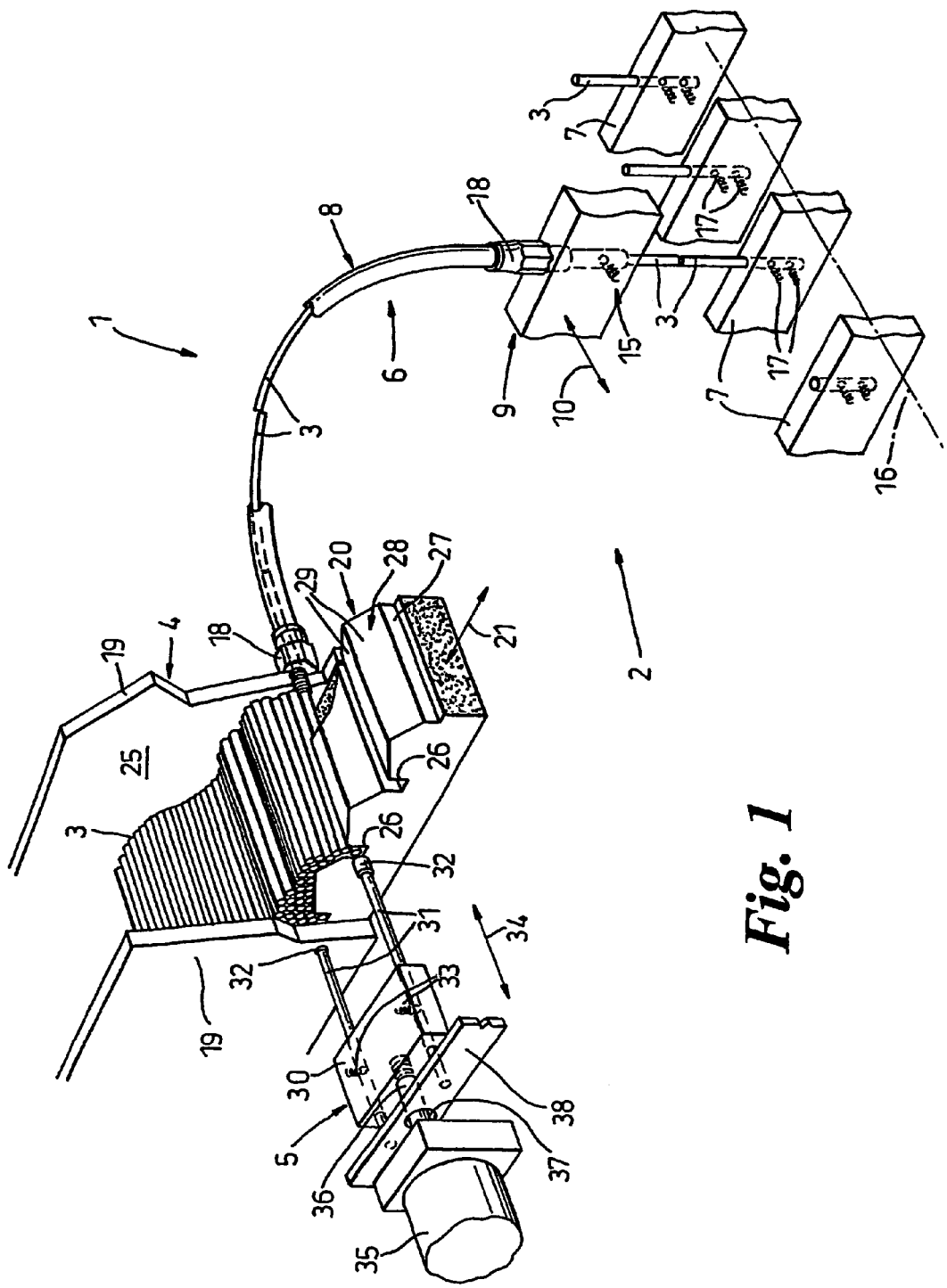
FIG. 1 which is a view in perspective of part of a machine for manufacturing lollipops.

An embodiment of the invention will now be described, by way of example only, with reference to FIG. 1 which is a view in perspective of part of a machine for manufacturing lollipops.

With reference to the drawing, a machine 1 for manufacturing lollipops is provided with apparatus 2 for the transfer of lollipop sticks 3 during manufacture. The apparatus 2 comprises a hopper 4 for holding a batch of the sticks 3 with their longitudinal axes substantially horizontal, ejector means 5 for ejecting a stick 3 from the hopper 4 in a substantially horizontal direction, and means 6 for feeding the ejected stick downwardly into a stick retainer 7 prior to placement in the sugar confectionery. The feeder means 6 comprises a conduit 8 operable to conduct the stick 3 from the hopper 4 to the stick retainer 7, whilst simultaneously changing the orientation of the stick to that of a downward direction.

The feeder means 6 further comprises a feeder bar 9, reciprocal in directions indicated by the double-header arrow 10 by actuating means (not shown) which may comprise mechanical, electrical or pneumatic devices. The feeder bar 9 houses a spring-loaded ball latch 15. In operation, the speed of the feeder bar 9 is matched to those of the stick retainers 7, which move along an axis 16. The retainers 7 which are also of bar form, are provided with pairs of spring-loaded ball latches 17, which retain a stick 3 in place. The retainers 7 are part of the lollipop manufacturing machine 1.

Quick-release couplings 18 connect the ends of the conduit 8 to the hopper 4 and feeder bar 9 respectively.

The lollipop sticks 3 each have a substantially circular cross-section. They are typically of resilient plastics material or rolled paper and are therefore flexible. The conduit 8 comprises a tube of flexible plastics material, which is also transparent. The tube is of annular lateral cross-section, and has a bore approximately 1.5 times that of a stick 3, so that some side clearance exists between the stick 3 and the tube.

The hopper 4 has stationery side walls 19 and a base 20 reciprocable therebetween, as indicated by the double-headed arrow 21. Reciprocation is achieved by actuating means (not shown) which may comprise mechanical, electrical or pneumatic devices.

The hopper 4 defines an upper storage chamber 25 with slot-like feed chambers 26 beneath, defined by the reciprocal base 20. The feed chambers 26 are laterally-spaced from each other and are formed between laterally-spaced formations 27 each with a pitch 28 with opposite faces 29 which slope downwardly, towards the chambers 26. The width of a chamber 26 is such that only one stick 3 can enter it. Reciprocation of the base 20 prevents bridging or log-jamming of the sticks 3 so that they enter the feed chambers 26 unimpeded. Withdrawal movement of a push rod 31 from a chamber 26 allows another stick 3 to enter the chamber.

The stick ejector means 5 comprises a reciprocable push bar 30 which locates and guides push rods 31 aligned with the feed chambers 26 and disposed within bushes 32 held within the hopper side wall 19 adjacent the ejector means. The push bar 30 is provided with overload devices in the form of spring-loaded ball devices 33 which retain the push rods 31 within the bar 30 and release the same, should a push rod jam. This arrangement ensures that one lane (along conduit 8) can misfeed without causing other lanes to misfeed as well.

The push bar 30 is reciprocable, as indicated by the double-headed arrow 34, by actuator means 35 comprising, in this example, a pneumatic cylinder, although alternative actuator means, such as electrical devices may be used.

The pneumatic cylinder 35 houses a piston (not shown), having a piston rod 36 connected to the push bar 30. The piston rod 36 extends through a hole 37 formed in a stationary bar 38, which forms a stop for the push rods 31. The position of the bar 38 can be varied according to operational requirements.

In operation, the push rods 31 are actuated so as to eject lollipop sticks 3 from feed chambers 26 into their associated conduits 8, only one of which is shown in the drawing. Reciprocation of a push rod 31 results in an end to end train of lollipop sticks 3 being pushed through the conduit 8 and into the feeder bar 9 before ejection therefrom into stick retainers 7.

The lollipop sticks 3, being flexible, can bend to accommodate the curvature of the conduit 8 which causes a stick to change in orientation from a substantially horizontal position, as it leaves feed chamber 26, to a substantially vertical position, as it enters a retainer 7, by way of the feeder bar 9.

The invention claimed is:

1. A process of manufacturing of lollipops comprising
    holding lollipop sticks (3) with their longitudinal axes substantially horizontal in a hopper (4),
    transferring the lollipop sticks (3) from a substantially horizontal condition in a hopper (4) to a substantially vertical condition in a stick retainer (7) prior to placement in sugar confectionery, by
    ejecting the sticks from the hopper in a substantially horizontal direction and
    feeding the ejected sticks through a conduit downwardly into a stick retainer (7) prior to placement in the sugar confectionery, and the sticks are pushed along the conduit in an end to end train of sticks by a push rod (3),
    the conduit conducting the sticks from the hopper to the stick retainer whilst simultaneously changing the orientation of the sticks to that of a downward direction.

2. Apparatus (1) for the transfer of lollipop sticks (3) during manufacture of lollipops comprising
    a hopper (4) for holding the sticks with their longitudinal axes substantially horizontal,
    means (5) for ejecting a stick from the hopper in a substantially horizontal direction and
    feeder means (6) for feeding the stick downwardly into a stick retainer (7) prior to placement in a sugar confectionery, the feeder means comprising
    a conduit (8) operable to conduct the stick from the hopper to the stick retainer whilst simultaneously changing an orientation of the stick to that of a downward direction, characterised in that
    the means (5) for ejecting the stick comprises a push rod (3), and
    in use, reciprocation of the push rod (3) causes an end to end train of sticks to be pushed along the conduit (8).

3. Apparatus as claimed in claim 2 in which the conduit (8) comprises a tube of flexible plastics material.

4. Apparatus as claimed in claim 2 in which the delivery end (18) of the conduit (8) is mounted on a reciprocatable carrier (9) that is arranged to be driven forwards in use in synchronism with stick retainers (7) that are adapted to receive the sticks (3) from the conduit (8).

5. Apparatus as claimed in claim 3 in which the delivery end (18) of the conduit (8) is mounted on a reciprocatable carrier (9) that is arranged to be driven forwards in use in synchronism with stick retainers (7) that are adapted to receive the sticks (3) from the conduit (8).

6. Apparatus as claimed in any one of claims 2, 3, 4 and 5 in which the conduit has a bore of approximately 1.5 times that of a stick (3), the stick being of substantially circular cross-section.

7. Apparatus as claimed in any one of claims 2, 3, 4 and 5 in which an actuator (35, 36) acts upon the push rod (31) through a spring-biased overload device (33).

8. Apparatus as claimed in any one of claims 2, 3, 4 and 5 in which the push rod is so arranged as, in use, to eject a stick from a slot (26) provided in the base of the hopper (4) into the conduit.

\* \* \* \* \*